Figure 1:
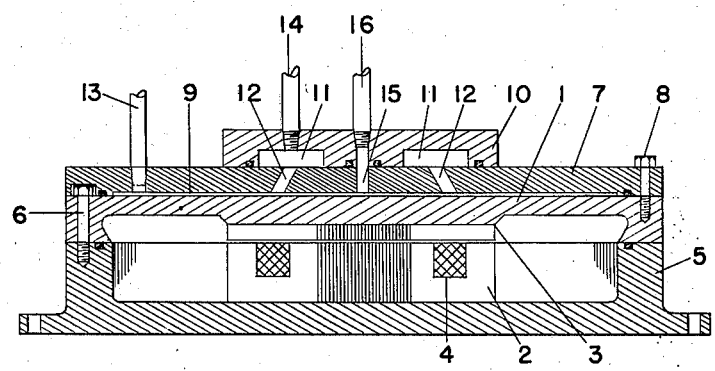

Aug. 12, 1941.  E. W. SMITH  2,251,959

APPARATUS FOR THE PRODUCTION OF FINELY DIVIDED SUBSTANCES

Original Filed Dec. 27, 1935

INVENTOR
EDWARD W. SMITH.
BY
ATTORNEY

Patented Aug. 12, 1941

2,251,959

UNITED STATES PATENT OFFICE 2,251,959

APPARATUS FOR THE PRODUCTION OF FINELY DIVIDED SUBSTANCES

Edward W. Smith, Melrose, Mass., assignor to Submarine Signal Company, Boston, Mass., a corporation of Maine Original application December 27, 1935, Serial No. 56,365. Divided and this application October 22, 1938, Serial No. 236,502

2 Claims. (Cl. 204—193)

The present application is a division of application Serial No. 56,365, filed December 27, 1935.

The present invention relates to an apparatus for the manufacture of finely divided materials produced by the reaction of two or more substances, particularly to the production of finely divided substances in the form of precipitates produced by such reaction.

Heretofore in the production of finely divided substances in the form of precipitates it has been customary simply to mix the reacting solutions, to allow the precipitate which is formed to settle at the bottom of the reaction chamber and after removing the remaining liquid to wash and dry the precipitate. While the precipitate which is produced by this method is usually in a finely divided state, the division is often insufficiently fine, making it necessary to use some grinding process in order to reduce the coarse particles, or where this is not possible, the product or process in which the precipitate is used may not be as desirable as would be the case if a more finely divided material were available.

On the other hand, in the manufacture of photographic emulsions, it is desirable to obtain a fine-grained silver halide suspended in a binder, such as gelatin. Here, too, the customary practice has been to produce the silver halide by the reaction between a silver salt solution, such as silver nitrate, and a halogen salt, such as potassium chloride. The products of this reaction are soluble potassium nitrate and precipitated silver chloride. The gelatin binder is usually mixed with one of the reacting liquids before the reaction takes place. Later, the soluble potassium nitrate is removed by washing. According to the present invention, extremely fine-grained photographic emulsions are produced by carrying out the silver halide precipitating reaction only under the influence of intense compressional wave vibration.

This is accomplished by means of the apparatus of the present invention which is so arranged that the two reacting solutions are brought into contact with each other only while each of them is subjected to intense compressional wave vibration, which vibration is continued until the reaction process is completed.

Apparatus for the treatment of liquids with intense compressional wave vibrations has previously been known in the art as shown, for example, by Patent No. 2,138,051, to Robert L. Williams, issued November 29, 1938. The present invention concerns similar apparatus.

The present invention also provides an apparatus suitable for the application of vibrational energy to reacting liquids, in a continuously operable system for the production of finely divided precipitates.

The latter is particularly adaptable to cases where one of the reacting substances is only difficultly soluble. For example, precipitated calcium carbonate, which is used commercially in the manufacture of tooth pastes, the sizing of paper and for other purposes is ordinarily obtained commercially as a by-product in the manufacture of caustic soda. The usual method of procedure is to fill a large tank with water and add to it lime or calcium oxide and a suitable amount of sodium carbonate. The mixture is then heated. By interaction between the water and the calcium oxide, calcium hydroxide is formed. As fast as the latter is produced, it reacts with the sodium carbonate until finally the tank contains caustic soda and a fine white precipitate of calcium carbonate. According to the present invention, intence vibrational energy is applied to the liquids while the reaction is taking place and more particularly such vibrational energy is applied at the instant and at the point where the two reacting liquids, for example, calcium hydroxide and sodium carbonate, come into contact with each other. Furthermore, the present invention provides a system for carrying out this process without the use of excessive amounts of water, in spite of the small solubility of calcium oxide.

Figure 2:
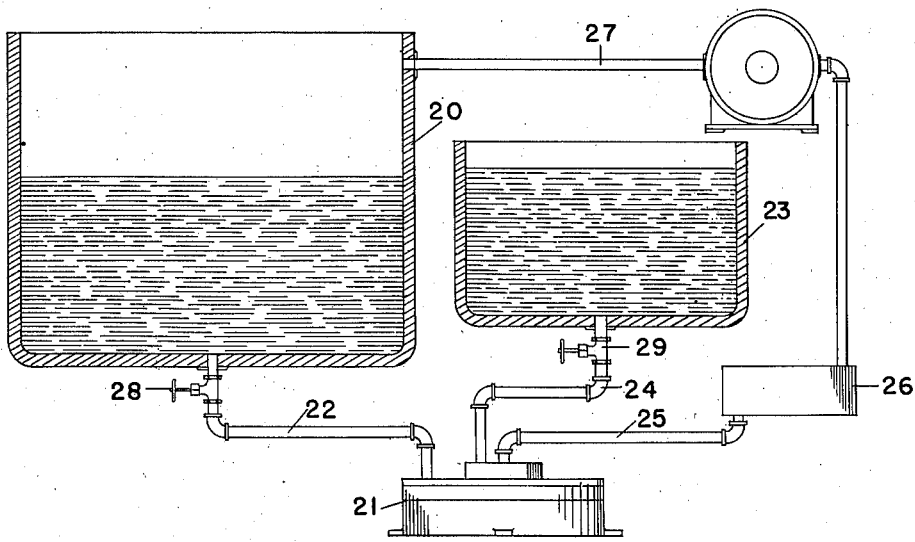

The above and other features of my invention will be understood from the following description taken in connection with the accompanying drawing in which Fig. 1 shows a cross section of an apparatus for applying vibrational energy to reacting liquids; Fig. 2 shows schematically a system for the production of finely divided precipitates.

In Fig. 1 the diaphragm 1 is adapted to be set into intense vibration by the action of the electromagnet 2 upon the armature 3 which is fixed to the diaphragm 1. The electromagnet 2 is energized by the winding 4 and is mounted within a casing 5 to which the diaphragm is securely fastened by means of screws 6. Above the diaphragm there is mounted a recessed cover plate 7 by means of the screws 8 forming a thin flat reaction chamber 9. The thickness of the chamber 9 is preferably of the order of 0.1 inch. Attached to the cover 7 is a smaller plate 10 which is provided with an annular groove 11 communicating with the reaction chamber 9 through a plurality of holes 12 in the cover 7.

A pipe 13 serves to conduct one of the reacting liquids into the chamber 9, the other liquid being conducted to the reaction chamber by means of the pipe 14 leading to the groove 11 and thence through the holes 12. An exit for the liquids is provided by the hole 15 extending through the cover 7 and the plate 10 and communicating with the outlet pipe 16.

The apparatus may be employed in the following manner: One of the reacting liquids, for example, potassium chloride solution is permitted to enter the reaction chamber 9 by means of the pipe 13 after the diaphragm has been set into vibration. The other reacting liquid, for example, silver nitrate solution, is allowed to flow through the pipe 14 and thence into the reaction chamber where it comes in contact with the potassium chloride under conditions of intense compressional wave vibration resulting in a chemical reaction producing potassium nitrate and a precipitate of silver chloride. The resulting liquid with the precipitate in suspension then flows out through the pipe 16. Gelatin or other binder may, if desired, be added to one of the reacting liquids before it enters the reaction chamber.

It will be noted that the apparatus just described is so arranged that the two reacting liquids can only come in contact with each other at a point where they are subject to intense compressional wave vibrations. It will also be understood that the rates of flow of the reacting liquids into the reaction chamber are adjusted so that the reaction is complete before the liquid leaves the reaction chamber. Furthermore, it will be evident that if more than two liquids are required to effect the reaction resulting in the formation of the desired precipitate, additional entrances may readily be provided to the reaction chamber.

In some instances, one of the reacting substances is only difficulty soluble as in the case of the calcium carbonate precipitating reaction mentioned above, where one of the reacting liquids, calcium hydroxide, is conveniently produced by mixing lime with water. Calcium hydroxide cannot readily be produced in very great concentration in this manner, and hence a relatively large amount of water is required to provide enough calcium hydroxide to react with a given volume of sodium carbonate.

Fig. 2 illustrates a complete system for carrying out this process without using undue quantities of water. The lime and water are mixed in the tank 20 and conducted to the vibrator 21 by means of the pipe 22. The sodium carbonate solution in tank 23 is conducted to the oscillator by means of the pipe 24. After the reaction under the influence of compressional wave vibration has been completed, the resulting liquid passes out of the oscillator through the pipe 25 and into the filter 26 where the precipitated calcium carbonate is separated from the liquid which consists of a solution of sodium hydroxide. This is pumped back through the pipe 27 into the tank 20 where it is available for the solution of aditional lime to provide calcium hydroxide for further action in the vibrator with sodium carbonate. Valves 28 and 29 may be employed to regulate the rates of flow of the two solutions.

With the system just described it is possible to operate with a relatively small quantity of water since the liquid is used over and over again until the resulting sodium hydroxide becomes so concentrated that it is not able any longer to dissolve appreciable amounts of lime.

In the event that the system is to be used for the production of some other precipitate where perhaps an excessive amount of water is not required, the pipe 27 may lead to a storage tank or other device instead of to the tank 20 as may appear to be desirable. The system is thus also useful for producing fine-grained photographic emulsions as above described. In this case the filter 26 would, of course, also be omitted.

While the present invention has been described above with particular reference to the production of fine-grained photographic emulsions and of precipitated calcium carbonate, it will be evident that it is applicable to the production of other precipitates.

Having now described my invention, I claim:

1. Apparatus for the production of finely divided precipitates by the reaction of two substances which comprises a vibratable diaphragm, means for vibrating the same, a recessed cover plate, means for mounting the same over the diaphragm thereby forming a thin, flat chamber having said diaphragm as one wall thereof, an aperture in said cover plate adapted to conduct a reactive substance into said chamber, a group of other apertures in said cover leading into said chamber at points spaced away from said first aperture, a plate having an annular groove mounted upon said cover with said groove in communication with said group of other apertures, means for conducting the other reactive substance to said annular groove and means for withdrawing reaction products from said chamber.

2. Apparatus for producing finely divided precipitates by the reaction of two or more liquids comprising means producing compressional wave vibrations, said means having a substantially plane vibrating surface, means forming a thin, substantially flat enclosed chamber with one wall thereof comprising said vibrating surface, a plate forming the opposite wall of said chamber and being positioned substantially parallel and close to said vibrating surface, whereby a space is provided through which liquid can flow, an inlet to said chamber near the edge thereof for one of the reacting liquids, separate inlets into said chamber through said plate and spaced between the center and the edge of the plate for the other reacting liquids and an outlet for the reaction products at the center of the plate.

EDWARD W. SMITH.